United States Patent Office 3,699,123
Patented Oct. 17, 1972

3,699,123
4-(3-AMINO-2-HYDROXY-PROPOXY) INDOLE DERIVATIVES
Fritz Seemann, Basel, and Franz Troxler, Bottmingen, Switzerland, assignors to Sandoz Ltd. (also known as Sandoz AG), Basel, Switzerland
No Drawing. Filed Mar. 16, 1971, Ser. No. 124,956
Claims priority, application Switzerland, Mar. 24, 1970, 4,373/70, 4,377/70; Nov. 18, 1970, 17,036/70
Int. Cl. C07d 27/56
U.S. Cl. 260—326.14 R    14 Claims

ABSTRACT OF THE DISCLOSURE

The present invention concerns novel compounds of the formula:

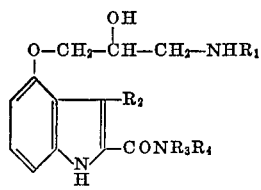

wherein $R_1$ is lower alkyl, cycloalkyl of 3 or 4 carbon atoms or phenylalkyl of at least 8 carbon atoms, the phenyl nucleus thereof being separated from the nitrogen atom by at least two alkyl carbon atoms, $R_2$ is hydrogen or methyl, and each of $R_3$ and $R_4$ is hydrogen or lower alkyl, or $R_3$ is amino, lower alkylamino, cycloalkyl of 3 or 4 carbon atoms or phenyl, and $R_4$ is hydrogen, or $R_3$ and $R_4$, together with the nitrogen atom to which they are bound, are 1-pyrrolidinyl, 1-piperidinyl or 1-morpholinyl, and acid addition salts thereof.

The compounds and their pharmaceutically acceptable acid addition salts have a blocking effect on the adrenergic $\beta$-receptors.

---

The present invention relates to indole derivatives.

The present invention provides compounds of Formula I,

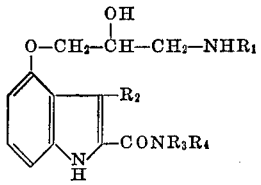

wherein
$R_1$ is lower alkyl, cycloalkyl of 3 or 4 carbon atoms or phenylalkyl of at least 8 carbon atoms, the phenyl nucleus thereof being separated from the nitrogen atom by at least two alkyl carbon atoms,
$R_2$ is hydrogen or methyl, and each of
$R_3$ and $R_4$ is hydrogen or alkyl of 1 to 4 carbon atoms, or
$R_3$ is amino, alkylamino of 1 to 4 alkyl carbon atoms, cycloalkyl of 3 or 4 carbon atoms or phenyl, and
$R_4$ is hydrogen, or
$R_3$ and $R_4$, together with the nitrogen atom to which they are bound, are 1-pyrrolidinyl, 1-piperidinyl or 1-morpholinyl,
or acid addition salts thereof.

The preferred compounds of Formula I are those wherein the radical $R_1$ is branched, especially on the $\alpha$-carbon atom, e.g. when $R_1$ is isopropyl, sec.butyl, tert.butyl, tert.pentyl, 3-pentyl or 1,1-dimethyl-3-phenylpropyl.

The present invention also provides a process for the production of a compound of Formula I or an acid addition salt thereof, comprising
(a) debenzylating a compound of Formula II,

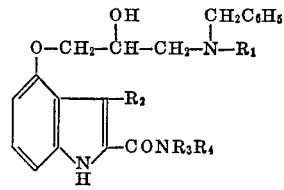

wherein $R_1$, $R_2$, $R_3$ and $R_4$ are as defined above, or
(b) reacting a compound of Formula III,

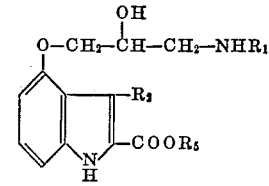

wherein $R_1$ and $R_2$ are as defined above, and $R_5$ is lower alkyl,
with a compound of Formula IV,

$$H_2NR_3'$$    IV wherein $R_3'$ is hydrogen, lower alkyl, cycloalkyl of 3 or 4 carbon atoms, phenyl, amino or lower alkylamino, to obtain a compound of Formula Ia,

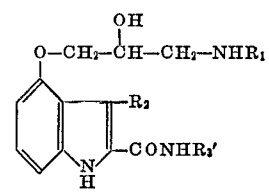

wherein $R_1$, $R_2$ and $R_3'$ are as defined above,
and when required converting the resulting compound into an acid addition salt.

The processes of the invention may, for example, be effected as follows:
(a) The debenzylation of the compounds of Formula II may, for example, be effected by hydrogenation in the presence of a catalyst, preferably a palladium catalyst. It is preferably effected in an inert solvent, e.g. ethyl acetate, or a lower alkanol such as ethanol. The reaction is conveniently effected at room temperature and normal pressure.
After hydrogenation is complete, the catalyst is filtered off and the filtrate is evaporated to dryness.
The resulting dry residue may be worked up and purified in accordance with known methods.
(b) The reaction of compounds of Formula III with compounds of Formula IV is preferably effected in an inert organic solvent, e.g. a cyclic ether such as dioxane, or an aromatic hydrocarbon such as benzene or toluene, or a lower alcohol such as n-amyl alcohol. The reaction is preferably continued for at least 2 hours, especially between 10 hours and 6 days. The reaction temperature may range from 20° to 150° C., preferably from 100° to 150° C., and conveniently the reaction is effected at the boiling temperature of the reaction mixture under reflux. If desired, the reaction may be effected in an autoclave.
The resulting compounds of Formula Ia may likewise be isolated in the usual manner and purified in accordance with known methods.
The compounds of Formula II are likewise new.

One process for the production of compounds of Formula IIa, $$\text{IIa}$$

[Structure: 4-substituted indole with O-CH$_2$-CH(OH)-CH$_2$-N(CH$_2$C$_6$H$_5$)-R$_1$ at 4-position, R$_2$ at 3-position, and CONR$_3''$R$_4'$ at 2-position]

wherein
R$_1$ and R$_2$ are as defined above, each of
R$_3''$ and R$_4'$ is hydrogen or lower alkyl, wherein R$_3''$ may also be cycloalkyl of 3 or 4 carbon atoms or phenyl, when R$_4'$ is hydrogen, or
R$_3''$ and R$_4'$, together with the nitrogen atom to which they are bound, signify 1-pyrrolidinyl, 1-piperidinyl or 1-morpholinyl, comprises treating a compound of Formula V, $$\text{V}$$

[Structure: 4-hydroxy indole with R$_2$ at 3-position and CONR$_3''$R$_4'$ at 2-position]

wherein R$_2$, R$_3''$ and R$_4'$ are as defined above, with an epihalohydrin, preferably epichlorhydrin or epibromhydrin, and reacting the resulting reaction product with an amine of Formula VI, $$\text{VI}$$

[Structure: C$_6$H$_5$-CH$_2$-NH-R$_1$]

wherein R$_1$ is as defined above.

For example, an excess of epihalohydrin is added to the compounds of Formula V in the presence of a base such as piperidine, and the mixture is heated, e.g. to the boiling temperature of the reaction mixture, for an extended period, e.g. 2 to 20 hours, preferably while stirring. After removing the excess epihalohydrin by distillation or completely concentrating the reaction mixture by evaporation, optionally in a vacuum, the residue is reacted with the amines of Formula VI, e.g. in an inert organic solvent, e.g. a cyclic ether such as dioxane, or an aromatic hydrocarbon such as benzene or toluene, the reaction having a duration of about 2 to 24 hours. The reaction temperature may range from 20° to 150° C.; the reaction is preferably effected at the boiling temperature of the reaction mixture under reflux.

One process for the production of compounds of Formula IIb, $$\text{IIb}$$

[Structure: 4-substituted indole with O-CH$_2$-CH(OH)-CH$_2$-N(CH$_2$C$_6$H$_5$)-R$_1$ at 4-position, R$_2$ at 3-position, and CONHNHR$_6$ at 2-position]

wherein R$_1$ and R$_2$ are as defined above, and R$_6$ is hydrogen or lower alkyl, is effected in a manner analogous to the production of compounds of Formula Ia, by reacting a compound of Formula VII, $$\text{VII}$$

[Structure: 4-substituted indole with O-CH$_2$-CH(OH)-CH$_2$-NR$_1$(CH$_2$C$_6$H$_5$) at 4-position, R$_2$ at 3-position, and COOR$_5$ at 2-position]

wherein R$_1$, R$_2$ and R$_5$ are as defined above, with hydrazine or lower alkyl hydrazine.

Compounds of Formula III and compounds of Formula VII may be produced in a manner analogous to the process for the production of compounds of Formula IIa, using the corresponding 4-hydroxy-indole-2-carboxylic acid esters of Formula VIII, $$\text{VIII}$$

[Structure: 4-hydroxy indole with R$_2$ at 3-position and COOR$_5$ at 2-position]

wherein R$_2$ and R$_5$ are as defined above.

The compounds of Formula V are likewise new.
Compounds of Formula Va, $$\text{Va}$$

[Structure: 4-hydroxy indole with R$_2$ at 3-position and CONR$_7$R$_8$ at 2-position]

wherein
R$_2$ is as defined above, and either each of
R$_7$ and R$_8$ is lower alkyl, or
R$_7$ and R$_8$, together with the nitrogen atom to which they are bound, are 1-pyrrolidinyl, 1-piperidinyl or 1-morpholinyl, may, for example, be obtained by reacting 4-benzyloxy-2-indole-carboxylic acid chloride with an amine of Formula IX, $$\text{HNR}_7\text{R}_8 \quad \text{IX}$$

wherein R$_7$ and R$_8$ are as defined above, optionally aminomethylating the resulting compound of Formula Xa, $$\text{Xa}$$

[Structure: 4-benzyloxy indole with O-CH$_2$C$_6$H$_5$ at 4-position and CONR$_7$R$_8$ at 2-position]

wherein R$_7$ and R$_8$ are as defined above, under the conditions of a Mannich reaction, to obtain a compound of Formula Xb, $$\text{Xb}$$

[Structure: 4-benzyloxy indole with O-CH$_2$C$_6$H$_5$ at 4-position, CH$_2$NRR' at 3-position and CONR$_7$R$_8$ at 2-position]

wherein
R$_7$ and R$_8$ are as defined above, and each of
R and R' is lower alkyl, and subjecting the resulting compounds of Formula XA or Xb to catalytic hydrogenation, e.g. in the presence of a palladium catalyst, or deaminating the Mannich bases of Formula Xb with sodium borohydride after previous quaternization with methyl iodide and subsequently debenzylating catalytically.

Compounds of Formula Vb, $$\text{Vb}$$

[Structure: 4-hydroxy indole with R$_2$ at 3-position and CONHR$_9$ at 2-position]

wherein
R$_2$ is as defined above, and
R$_9$ is hydrogen, lower alkyl, cycloalkyl of 3 or 4 carbon atoms or phenyl, may, for example, be obtained by debenzylating a compound of Formula XI,

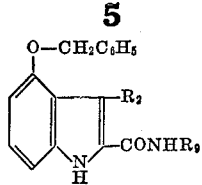

XI wherein $R_2$ and $R_9$ are as defined above, e.g., by hydrogenation in the presence of a palladium catalyst.

The compounds of Formula XI are likewise new and may be produced by reaction of a compound of Formula XII,

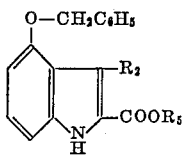

XII wherein $R_2$ and $R_5$ are as defined above, with the corresponding amines.

The esters of Formula XIIa,

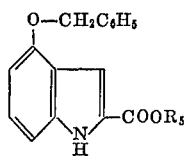

XIIa wherein $R_5$ is as defined above, may be produced by esterification of 4-benzyloxy-2-indole-carboxylic acid. Aminomethylation of these compounds of Formula XIIa and catalytic hydrogenation of the resulting Mannich bases yields the 4-hydroxy-3-methyl-2-indole-carboxylic acid ester compounds of Formula VIII, wherein $R_2$ is methyl, which may be converted into compounds of Formula XIIb,

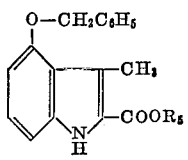

XIIb wherein $R_5$ is as defined above, by reaction with benzyl chloride under alkaline conditions.

The production of compounds of Formula VIII, wherein $R_2$ is methyl, has already been described above.

4-hydroxy-indole-2-carboxylic acid esters, i.e. compounds of Formula VIII, wherein $R_2$ is hydrogen, may, for example, be obtained by hydrogenolytic debenzylation of the corresponding 4-benzyloxy-indole-2-carboxylic acid esters of Formula XIIa.

Insofar as the production of the starting materials is not described, these are known or may be produced in accordance with known processes or in a manner analogous to the processes described herein or to known processes.

When $R_1$ is lower alkyl, then this preferably contains 1 to 6 carbon atoms. When $R_1$ is phenylalkyl, then this preferably contains 8 to 13 carbon atoms. When $R_3$, $R_3'$ or $R_3''$ are lower alkyl, then these preferably contain 1 to 4 carbon atoms. When $R_4$ or $R_4'$ are lower alkyl, these preferably contain 1 to 4 carbon atoms. When $R_3$ is lower alkylamino, then it preferably contains 1 to 4 alkyl carbon atoms. $R_5$ preferably contains 1 to 4 carbon atoms.

The compounds of Formula I form stable, generally soluble acid addition salts with inorganic acids, e.g. hydrochloric, hydrobromic or sulphuric acid, or with organic acids, e.g. oxalic, fumaric, maleic, tartaric or benzoic acid, methane-, ethane- or p-toluene-sulphonic acid, or cyclohexylsulphamic acid.

The compounds of Formula I and their pharmaceutically acceptable acid addition salts have hitherto not been described in the literature. They are useful because they possess pharmacological activity in animals.

In particular, the compounds are useful as blocking agents on the adrenergic β-receptors as indicated by an inhibition of the positive inotropic adrenalin effect in the isolated, spontaneously beating atrium of guinea pigs, this effect appearing at bath concentrations from about 0.001 to 20 mg./liter, and also by an inhibition of tachycardia and hypotension caused by isoproterenol [1-(3,4-dihydroxyphenyl-2-isopropylaminoethanol] in the narcotized animal (cat, dog). The compounds, especially 4-(3-tert.-butylamino-2-hydroxypropoxy)-N'-methyl - 2 - indole-carbohydrazide, are particularly useful in that they possess a large therapeutic breadth, i.e. a large difference between the dose at which a satisfactory blocking effect on the β-receptors is obtained, and the dose which produces an auto-effect.

The compounds also exhibit useful antiarrhythmic effects as indicated in the abovementioned tests.

For the abovementioned uses, the dose to be administered naturally varies depending on the compound used, the mode of administration and the condition to be treated. However, satisfactory results are generally obtained at doses between 0.001 and 0.6 mg./kg. animal body weight. The daily dose for larger mammals amounts to between about 2 and 400 mg., which may be administered in divided doses two or three times daily, or in retard form. A unit dosage form suitable for oral administration may contain between approximately 0.6 and 200 mg. of the compound admixed with solid or liquid pharmaceutical carriers or diluents.

In the following non-limitative examples all temperatures are indicated in degree centigrade and are uncorrected.

EXAMPLE 1

2-dimethylcarbamoyl-4-(2-hydroxy-3-isopropylaminopropoxy)indole [process (a)]

4.8 g. of 1-(N-benzylisopropylamino)-3-chloro-2-propanol are added to a solution of 2.04 g. of 2-dimethylcarbamoyl-4-hydroxyindole and 0.4 g. of sodium hydroxide in 150 cc. of methanol, and the mixture is heated to the boil for 20 hours. The solvent is removed by evaporation at reduced pressure, the residue is taken up in ether and extracted with water. The ethereal solution is subsequently concentrated until crystallization commences; M.P. 160–162°.

1 g. of the 2-dimethylaminocarbamoyl-4-(2-hydroxy-3-benzylisopropylaminopropoxy)indole obtained above is taken up in 50 cc. of methanol, and after the addition of 0.5 g. of a palladium catalyst (5% of palladium on aluminium oxide) shaking is effected with hydrogen until the taking up of hydrogen is complete. The catalyst is filtered off, the solvent is almost completely removed by evaporation at reduced pressure and the heading compound is crystallized with ethyl acetate; M.P. 156–158°.

The 1-(N-benzylisopropylamino)-3-chloro-2 - propanol used as starting material may, for example, be produced as follows:

A mixture of 18.4 g. of epichlorhydrin and 29.8 g. of N-benzylisopropyl amine in 100 cc. of benzene is heated to the boil at reflux for 24 hours, the solvent is subsequently evaporated and the residue is distilled in a high vacuum, whereby 1-(N-benzylisopropylamino-3-chloro-2-propanol, having a B.P. of 110–115°/0.2 mm. of Hg, is obtained.

2-dimethylcarbamoyl-4-hydroxyindole (M.P. 231–234° from acetone) is obtained by debenzylation of 2-dimethylcarbamoyl-4-benzyloxyindole (= 4-benzyloxyindole-2-carboxylic acid dimethyl amide) with hydrogen in the presence of a palladium catalyst (5% on aluminium oxide).

EXAMPLE 2

4-(2-hydroxy-3-isopropylaminopropoxy)-2-indole-carbohydrazide [process (a)]

The title compound, having a M.P. of 213–215° (from methanol), is obtained in a manner analogous to that described in Example 1, by debenzylation of 4-[3-(N-benzylisopropylamino) - 2 - hydroxypropoxy] - 2 - indole-carbohydrazide.

4-[3-(N-benzylisopropylamino) - 2 - hydroxypropoxy]-2-indole-carbohydrazide (M.P. 193–195°) is obtained by reaction of 4-hydroxyindole-2-carboxylic acid ethyl ester (M.P. 159–160°) with 1-(N-benzylisopropylamino)-3-chloro-2-propanol (M.P. 110–115°/0.2 mm. of Hg) and treatment of the resulting 4-[3-(N-benzylisopropylamino)-2-hydroxypropoxy]indole-2-carboxylic acid ethyl ester (M.P. 103–105°) with hydrazine.

4-hydroxyindole-2-carboxylic acid ethyl ester is obtained by debenzylation of 4-benzyloxyindole-2-carboxylic acid ethyl ester (M.P. 159–160°) and the latter compound is obtained by esterification of 4-benzyloxyindole-2-carboxylic acid.

1-(N-benzylisopropylamino)-3-chloro-2-propanol is obtained by heating a mixture of epichlorhydrin and N-benzylisopropyl amine in benzene.

EXAMPLE 3

4-(2-hydroxy-3-isopropylaminopropoxy)-2-methylcarbamoyl-indole [process (a)]

The title compound, having a M.P. of 163–165° (from methanol), is obtained in a manner analogous to that described in Example 1, by debenzylation of 4-[3-(N-benzylisopropylamino) - 2 - hydroxypropoxy] - 2-methylcarbamoyl-indole.

4-[3 - (N - benzylisopropylamino) - 2 - hydroxypropoxy] - 2 - methylcarbamoyl - indole is produced by reaction of 4 - hydroxy - 2 - methylcarbamoyl - indole (M.P. 201–203°) with 1 - (N-benzylisopropylamino)-3-chloro-2-propanol.

4 - hydroxy - 2 - methylcarbamoyl - indole is obtained by reaction of 4 - benzyloxyindole - 2 - carboxylic acid with methyl amine and debenzylation of the resulting 4 - benzyloxy - 2 - methylcarbamoyl - indole having a M.P. of 219–221°.

EXAMPLE 4

2-carbamoyl-4-(2-hydroxy-3-isopropylaminopropoxy)indole [process (a)]

The title compound, having a M.P. of 155–158° (from ethanol/ethyl acetate), is obtained in a manner analogous to that described in Example 1, by debenzylation of 4-[3-(N - benzylisopropylamino) - 2 - hydroxypropoxy]-2-carbamoyl-indole.

4 - [3 - (N - benzylisopropylamino) - 2-hydroxypropoxy] - 2 - carbamoyl - indole is obtained in a manner analogous to that described in Example 1 by using 2-carbamoyl - 4 - hydroxyindole as starting material.

The latter compound is obtained by reaction of 4-benzyloxyindole - 2 - carboxylic acid chloride with ammonia and debenzylation of the resulting 4 - benzyloxy-2 - carbamoyl - indole having a M.P. of 187–189°.

EXAMPLE 5

4-(3-tert.butylamino-2-hydroxypropoxy)-N'-methyl-2-indole-carbohydrazide [process (a)]

This compound is obtained in a manner analogous to that described in Example 1 by debenzylation of 4-[3-(N - benzyl - tert.butyl - amino) - 2 - hydroxypropoxy]-N'-methyl - 2 - indole - carbohydrazide.

The sesquihydrogen maleate of the title compound has a M.P. of 191–193°.

4 - [3 - (N - benzyl - tert.butylamino) - 2 - hydroxypropoxy] - N' - methyl - 2 - indole - carbohydrazide (M.P. 203–207°) is produced by treatment of 4 - [3 - (N - benzyl - tert.butylamino) - 2 - hydroxypropoxy]indole-2-carboxylic acid ethyl ester with methyl hydrazine. The ester used above is obtained by reaction of 4-hydroxyindole - 2 - carboxylic acid ethyl ester with epichlorhydrin and treatment of the resulting reaction product with N-benzyl-tert.butyl amine.

EXAMPLE 6

4-(3-tert.butylamino-2-hydroxypropoxy)-2-indole-carbohydrazide [process (a)]

The title compound, having a M.P. of 210–213° (from ethanol), is obtained in a manner analogous to that described in Example 1 by debenzylation of 4 - [3-(N-benzyl - tert.butylamino) - 2 - hydroxypropoxy]-2-indole-carbohydrazide.

4 - [3 - (N - benzyl - tert.butylamino) - 2 - hydroxypropoxy] - 2 - indole - carbohydrazide (M.P. 213–216°) is obtained as described in Example 5 by reaction of 4-[3-(N-benzyl-tert.butylamino) - 2 - hydroxypropoxy] indole - 2 - carboxylic acid ethyl ester with hydrazine.

EXAMPLE 7

4-(2-hydroxy-3-isopropylaminopropoxy)-N'-methyl-2-indole-carbohydrazide [process (a)]

The title compound, having a M.P. of 203–206° (from ethanol) is obtained in a manner analogous to that described in Example 1 by debenzylation of 4-[3-(N-benzylisopropylamino) - 2 - hydroxypropoxy] - N' - methyl-2-indole-carbohydrazide.

4 - [3 - (N - benzylisopropylamino) - 2 - hydroxypropoxy]-N'-methyl - 2 - indole-carbohydrazide (M.P. 180–183°) is obtained by treatment of 4-[3-(N-benzylisopropylamino) - 2 - hydroxypropoxy]indole - 2 - carboxylic acid ethyl ester with methyl hydrazine.

EXAMPLE 8

4-(2-hydroxy-3-isopropylaminopropoxy)-N'-isopropyl-2-indole-carbohydrazide [process (a)]

The title compound, having a M.P. of 196–198° (from methanol), is obtained in a manner analogous to that described in Example 1 by debenzylation of 4-[3-(N-benzylisopropylamino) - 2 - hydroxypropoxy] - N'-isopropyl - 2 - indole-carbohydrazide.

4 - [3 - (N - benzylisopropylamino) - 2 - hydroxypropoxy] - N' - isopropyl - 2 - indole - carbohydrazide is obtained by treatment of 4 - [3 - (N-benzylisopropylamino) - 2 - hydroxypropoxy]indole - 2 - carboxylic acid ethyl ester with isopropyl hydrazine.

EXAMPLE 9

2-dimethylcarbamoyl-4-(2-hydroxy-3-isopropylaminopropoxy)-3-methyl-indole [process (a)]

The title compound, having a M.P. of 118–121° (from ethyl acetate), is obtained in a manner analogous to that described in Example 1 by debenzylation of 4-[3-(N-benzylisopropylamino) - 2 - hydroxypropoxy] - 2 - dimethylcarbamoyl - 3 - methyl - indole.

4 - [3 - (N - benzylisopropylamino) - 2 - hydroxypropoxy] - 2 - dimethylcarbamoyl - 3 - methyl-indole is obtained by reaction of 4 - hydroxy - 3 - methylindole-2-carboxylic acid dimethyl amide with epichlorhydrin and treatment of the resulting reaction product with N-benzylisopropyl amine.

4-hydroxy - 3 - methylindole - 2 - carboxylic acid dimethyl amide is obtained by aminomethylation of 4-benzyloxyindole - 2 - carboxylic acid dimethyl amide and hydrogenation of 4 - benzyloxy - 3 - dimethylaminomethylindole - 2 - carboxylic acid dimethyl amide with hydrogen in the presence of a palladium catalyst (5% on aluminum oxide).

EXAMPLE 10

4-(2-hydroxy-3-isopropylaminopropoxy)-2-methyl-carbamoyl-indole [process (b)]

10 g. of 4 - (2 - hydroxy - 3 - isopropylaminopropoxy) indole - 2 - carboxylic acid ethyl ester are heated to 130° in an autoclave for 15 hours together with 200 cc. of a 10% solution of methyl amine in dioxane. The solvent is subsequently removed by evaporation at reduced pressure, and the residue is crystallized from methanol. The heading compound crystallizes and has a M.P. of 163–165°.

The 4 - (2-hydroxy-3-isopropylaminopropoxy)indole-2 - carboxylic acid ethyl ester, used as starting material, may, for example, be produced as follows:

A solution of 20 g. of sodium hydroxide in 500 cc. of water is added to a solution of 106 g. of 4 - hydroxy-indole - 2 - carboxylic acid ethyl ester in 200 cc. of dioxane, 120 g. of epichlorhydrin are added at room temperature, and the mixture is stirred at 80° for 3 hours. After cooling, extraction is effected with a mixture of 2 liters of choroform and 400 cc. of dioxane, the organic phase is washed with a saturated common salt solution, is dried over sodium sulphate and evaporated to dryness. The dry residue is dissolved in 200 cc. of dioxane, 190 cc. of isopropyl amine are added, the mixture is kept at a temperature of 65–70° for 1 hour and is again evaporated to dryness. The basic portion of the dry residue is separated in the usual manner and recrystallized from isopropanol. M.P. 149–151°.

4 - hydroxy-indole - 2 - carboxylic acid ethyl ester may, for example, be produced as follows:

A mixture of 0.14 kg. of potassium tert, butylate, 1.2 kg.of oxalic acid diethyl ester and 243 g. of 2-benzyloxy-6-nitrotoluene is heated to 60° for 2 hours, the butanol and ethanol are removed by distillation in a vacuum, the residue is extracted between dilute acetic acid and toluene, the toluene solution is neutralized with a mixture of 110 cc. of 20% sodium carbonate solution and 550 cc. of saturated common salt solution, and the washed toluene solution is evaporated to dryness. A solution of the dry residue in glacial acetic acid is then slowly added dropwise to a boiling suspension of 900 g. of iron powder in ethanol, and the mixture is kept at reflux for a further hour. The cooled solution is made alkaline by the careful addition of a soda solution and is sucked off over Hyflo after the addition of Standard Super Cel. Washing is effected with water, the filter residue is stirred at room temperature with chloroform, is again sucked off over Hyflo and washed with chloroform. The chloroform solution is washed with water and subsequently concentrated by evaporation. The 4-benzyloxy-indole-2 - carboxylic acid ethyl ester obtained as residue is recrystalized from trichloroethylene; M.P. 168–170°. Catalytic debenzylation of this compound with palladium/hydrogen yields 4-hydroxy-indole-2-carboxylic acid ethyl ester (M.P. 159–160° from water).

EXAMPLE 11

4 - (2 - hydroxy - 3 - isopropylaminopropoxy)-2-indole-carbohydrazide [process (b)]

The title compound which crystallizes from methanol with a M.P. of 213–215°, is obtained in a manner analogous to that described in Example 10 by reacting 4 - (2 - hydroxy - 3 - isopropylaminopropoxy)indole-2-carboxylic acid ethyl ester (M.P. 149–151°) with hydrazine.

EXAMPLE 12

4 - (2 - hydroxy - 3 - isopropylaminopropoxy)-2-indole-carbamide [process (b)]

The title compound which crystallizes from ethyl acetate/ethanol with a M.P. of 155–158°, is obtained in a manner analogous to that described in Example 10 by reacting 4-(2-hydroxy-3-isopropylaminopropoxy)indole-2-carboxylic acid ethyl ester (M.P. 149–151°) with ammonia.

EXAMPLE 13

4 - (3 - tert.butylamino-2-hydroxypropoxy)-N'-methyl-2-indole-carbohydrazide [process (b)]

The title compound is obtained in a manner analogous to that described in Example 10 by reacting 4-(3-tert.butylamino-2-hydroxypropoxy)indole - 2 - carboxylic acid ethyl ester (M.P. of the N-cyclohexyl sulphamate 169–171°) with methyl hydrazine.

The sesquihydrogen maleate of the title compound crystallizes from methanol with a M.P. of 191–193°.

EXAMPLE 14

4-(3-tert.butylamino-2-hydroxypropoxy)-2-indole-carbohydrazide [process (b)]

The title compound which crystallizes from ethanol with a M.P. of 210–213°, is obtained in a manner analogous to that described in Example 10 by reacting 4 - (3 - tert.butylamino - 2 - hydroxypropoxy)indole-2-carboxylic acid ethyl ester (M.P. of the cyclohexyl sulphamate 169–171°) with hydrazine.

EXAMPLE 15

4 - (2 - hydroxy - 3 - isopropylaminopropoxy)-N'-methyl-2-indole-carbohydrazide [process (b)]

The title compound which crystallizes from ethanol with a M.P. of 203–206°, is obtained in a manner analogous to that described in Example 10 by reacting 4 - (2 - hydroxy - 3 - isopropylaminopropoxy)indole-2-carboxylic acid ethyl ester (M.P. 149–151°) with methyl hydrazine.

EXAMPLE 16

4 - (2 - hydroxy - 3 - isopropylaminopropoxy)-N'-isopropyl-2-indole-carbohydrazide [process (b)]

The title compound which crystallizes from methanol with a M.P. of 196–198°, is obtained in a manner analogous to that described in Example 10 by reacting 4 - (2 - hydroxy - 3 - isopropylaminopropoxy)indole-2-carboxylic acid ethyl ester (M.P. 149–151°) with isopropyl hydrazine.

EXAMPLE 17

4 - (2 - hydroxy - 3 - isoproplyaminopropoxy)indole-2-carboxylic acid cyclopropyl amide [process (b)]

27.2 g. of crude 4 - (2,3 - epoxypropoxy)indole-2-carboxylic acid cyclopropyl amide are taken up in 200 cc. of dioxane and 41.7 g. of benzylisopropyl amine, and the mixture is heated to 150° in an autoclave for 18 hours. The reaction mixture is evaporated to dryness, is subsequently extracted between ethyl acetate and 10% hydrochloric acid, and any resulting resin is made alkaline together with the hydrochloric acid extracts while cooling with ice. Extraction is effected with methylene chloride, the organic phases are dried over magnesium sulphate and are concentrated by evaporation at reduced pressure. A large amount of the excess benzylisopropyl amine is removed by shaking the resulting oily residue several times with petroleum ether and decanting. The resulting oily 4 - (3 - benzylisopropylamino-2-hydroxypropoxy)indole -2 - carboxylic acid cyclopropyl amide is then taken up in 300 cc. of methanol and shaken in the presence of 13 g. of a palladium catalyst (5% of Pd on charcoal) with hydrogen until the taking up of hydrogen stops. The catalyst is filtered off, the filtrate is evaporated to dryness at reduced pressure and the heading compound is crystallized from ethyl acetate/ether. M.P. 145–147°.

The 4-(2,3-epoxypropoxy)indole - 2 - carboxylic acid cyclopropyl amide, required as starting material, may be obtained as follows:

4 - benzyloxy - indole - 2 - carboxylic acid chloride is reacted with cyclopropyl amine to obtain 4 - benzyloxy-indole - 2 - carboxylic acid cyclopropyl amide (M.P. 199–202°), and this is debenzylated in tetrahydrofuran, in the presence of a palladium catalyst (5% of Pd on charcoal), with hydrogen to obtain 4 - hydroxy-indole-2-carboxylic acid cyclopropyl amide (M.P. 244–246°).

43 g. of 4 - hydroxy-indole - 2 - carboxylic acid cyclopropyl amide are heated to the boil at reflux with 190 cc. of epichlorhydrin for 2 hours, and the mixture is subsequently concentrated by evaporation at reduced pressure. The resulting crude 4 - (2,3 - epoxypropoxy) indole - 2 - carboxylic acid cyclopropyl amide is used for the next reaction without previous purification.

EXAMPLE 18

4 - (2 - hydroxy - 3 - isopropylaminopropoxy)indole-2-carboxylic acid cyclopropyl amide [process (b)]

The title compound, having a M.P. of 145–147°, is obtained in a manner analogous to that described in Example 10 by reacting 4 - (2 - hydroxy-3-isopropylaminopropoxy)indole-2-carboxylic acid ethyl ester with cyclopropyl amine.

EXAMPLE 19

4-(2-hydroxy-3-isopropylaminopropoxy)indole-2-carboxylic acid anilide ([process (b)]

This compound is obtained in a manner analogous to that described in Example 17, except that 4-(2,3-epoxypropoxy)indole-2-carboxylic acid anilide is used in place of 4 - (2,3-epoxypropoxy)indole-2-carboxylic acid cyclopropyl amide. The title compound crystallizes from methanol/ethanol in prisms having a M.P. of 238–241°.

The starting material is likewise obtained in a manner analogous to that described in Example 17, using 4-benzyloxyindole-2-carboxylic acid chloride as starting material: 4 - benzyloxyindole-2-carboxylicacid anilide, M.P. 199–201°;
4 - hydroxyindole - 2-carboxylic acid anilide, M.P. 203–205°.

EXAMPLE 20

4-(2-hydroxy-3-isopropylaminopropoxy)indole-2-carboxylic acid anilide [process (b)]

The title compound, having a M.P. of 238–241°, is obtained ina manner analogous to that described in Example 10 by reacting 4-(2-hydroxy-3-isopropylaminopropoxy)indole-2-carboxylic acid ethyl ester with aniline.

EXAMPLE 21

4-[2-hydroxy-3-(2-methyl-4-phenyl-2-butylamino) propoxy]indole-2-carboxamide [process (b)]

26.1 g. of 4 - (2,3-epoxypropoxy)indole-2-carboxylic acid ethyl ester, 20 g. of 2-methyl-4-phenyl-2-butyl amine and 200 cc. of dioxane are heated to the boil for 12 hours. The reaction mixture is evaporated to dryness at reduced pressure, the residue is taken up in ethyl acetate, and the basic components are extracted with tartaric acid. The combined tartaric acid phases are made alkaline with a soda solution while cooling, are extracted with methylene chloride, the methylene chloride extracts are dried over magnesium sulphate and concentrated by evaporation at reduced pressure. The resulting crude, oily 4-[2-hydroxy-3 - (2 - methyl-4-phenyl-2-butylamino)propoxy]-indole-2-carboxylic acid ethyl ester is directly taken up in 750 cc. of a saturated solution of ammonia in methanol, and this mixture is heated to 150° in an autoclave for 5 days. The reaction mixture is evaporated to dryness at reduced pressure and the residue is chromatographed on water-saturated silica gel with methylene chloride+5% of methanol. The purified title compound is subsequently converted into its hydrogen maleate, M.P. 219–220°.

EXAMPLE 22

4-[2-hydroxy-3-(2-methyl-4-phenyl-2-butylamino) propoxy]indole-2-carboxamide [process (a)]

The title compound is obtained in a manner analogous to that described in Example 1 by debenzylation of 4-[3- (N - benzyl-2-methyl-4-phenyl-2-butylamino)-2-hydroxypropoxy]indole-2-carboxamide.

The hydrogen maleate of the title compound has a M.P. of 219–220°.

4 - [3 - (N-Benzyl-2-methyl-4-phenyl-2-butylamino)-2-hydroxypropoxy]indole-2-carboxamide is obtained by reaction of 2-carbamoyl-4-hydroxyindole with epichlorhydrin and treatment of the resulting reaction product with N-benzyl-2-methyl-4-phenyl-2-butyl amine.

What is claimed is:

1. A compound of the formula:

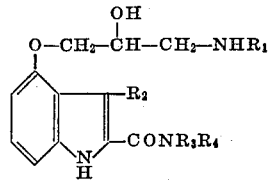

wherein $R_1$ is alkyl of 1 to 6 carbon atoms, cycloalkyl of 3 or 4 carbon atoms or phenylalkyl of 8 to 13 carbon atoms, the phenyl nucleus thereof being separated from the nitrogen atom by at least two alkyl carbon atoms, $R_2$ is hydrogen or methyl, and each of $R_3$ and $R_4$ is hydrogen or alkyl of 1 to 4 carbon atoms, or $R_3$ is amino, alkylamino of 1 to 4 alkyl carbon atoms, cycloalkyl of 3 or 4 carbon atoms or phenyl, and $R_4$ is hydrogen, or $R_3$ and $R_4$, together with the nitrogen atom to which they are bound, are 1-pyrrolidinyl, 1-piperidinyl or 1-morpholinyl, or a pharmaceutically acceptable acid addition salt thereof.

2. The compound of claim 1, which is 2-dimethylcarbamoyl-4-(2-hydroxy-3-isopropylaminopropoxy)indole.

3. The compound of claim 1, which is 4-(2-hydroxy-3-isopropylaminopropoxy)-2-indole-carbohydrazide.

4. The compound of claim 1, which is 4-(2-hydroxy-3-isopropylaminopropoxy)-2-methylcarbomoyl-indole.

5. The compound of claim 1, which is 2-carbomoyl-4-(2-hydroxy-3-isopropylaminopropoxy)indole.

6. The compound of claim 1, which is 4-(3-tert.butylamino - 2 - hydropropoxy)-N'-methyl-2-indole-carbohydrazide.

7. The compound of claim 1, which is 4-(3-tert.butyl-amino-2-hydroxypropoxy)-2-indole-carbohydrazide.

8. The compound of claim 1, which is 4-(2-hydroxy-3 - isopropylaminopropoxy) - N'-methyl-2-indole-carbohydrazide.

9. The compound of claim 1, which is 4-(2-hydroxy-3-isopropylaminopropoxy) - N' - isopropyl-2-indole-carbohydrazide.

10. The compound of claim 1, which is 2-dimethylcarbamoyl - 4 - (2-hydroxy-3-isopropylaminopropoxy)-3-methyl-indole.

11. The compound of claim 1, which is 4-(2-hydroxy-3-isopropylaminopropoxy)-2-indole-carbamide.

12. The compound of claim 1, which is 4-(2-hydroxy-3-isopropylaminopropoxy)indole-2-carboxylic acid cyclopropyl amide.

13. The compound of claim 1, which is 4-(2-hydroxy-3 - isopropylaminopropoxy)indole - 2 - carboxylic acid anilide.

14. The compound of claim 1, which is 4-[2-hydroxy-3 - (2 - methyl-4-phenyl-2-butylamino)propoxy]indole-2-carboxamide.

References Cited

UNITED STATES PATENTS 3,280,145   10/1966   Hofmann et al.   260—326.15

ALEX MAZEL, Primary Examiner

J. A. NARCAVAGE, Assistant Examiner

U.S. Cl. X.R.

260—247.5 B, 293.61, 326.13R; 424—274